United States Patent
Lee

(10) Patent No.: US 12,511,944 B2
(45) Date of Patent: Dec. 30, 2025

(54) COMPANION ANIMAL LIFE MANAGEMENT SYSTEM AND METHOD THEREFOR

(71) Applicant: Ajirang rangirang Inc., Seoul (KR)

(72) Inventor: Tae Gwon Lee, Seoul (KR)

(73) Assignee: AJIRANG RANGIRANG, Seoul (KR)

( * ) Notice: Subject to any disclaimer, the term of this patent is extended or adjusted under 35 U.S.C. 154(b) by 290 days.

(21) Appl. No.: 18/274,512

(22) PCT Filed: Apr. 29, 2022

(86) PCT No.: PCT/KR2022/006158
§ 371 (c)(1),
(2) Date: Jul. 27, 2023

(87) PCT Pub. No.: WO2022/240030
PCT Pub. Date: Nov. 17, 2022

(65) Prior Publication Data
US 2024/0087368 A1    Mar. 14, 2024

(30) Foreign Application Priority Data
May 11, 2021 (KR) .................. 10-2021-0060776

(51) Int. Cl.
*G06V 40/50* (2022.01)
*A01K 29/00* (2006.01)
(Continued)

(52) U.S. Cl.
CPC .......... *G06V 40/50* (2022.01); *A01K 29/005* (2013.01); *G06Q 40/08* (2013.01); *G06V 10/25* (2022.01); *G06V 10/44* (2022.01); *G06V 10/761* (2022.01); *G06V 10/764* (2022.01); *G06V 10/774* (2022.01); *G06V 10/82* (2022.01); *G06V 40/10* (2022.01); *G06V 40/20* (2022.01); *G10L 17/02* (2013.01); *G10L 17/04* (2013.01);
(Continued)

(58) Field of Classification Search
CPC ........ G06V 10/25; G06V 10/44; G06V 10/82; G06V 10/761; G06V 10/764; G06V 10/774; G06V 40/10; G06V 40/20; G16H 10/60; G06Q 40/08; G10L 17/02; G10L 17/04; G10L 17/18; G10L 17/26; A01K 29/005
See application file for complete search history.

(56) References Cited

U.S. PATENT DOCUMENTS

2022/0188661 A1\*  6/2022  Tappin .................. G06F 16/248

FOREIGN PATENT DOCUMENTS

KR    10-2014-0137149 A    12/2014
KR       10-1788272 B1     10/2017
(Continued)

OTHER PUBLICATIONS

Notice of Allowance for KR 10-2021-0060776 dated Oct. 20, 2021.
International Search Report for PCT/KR2022/006158 dated Aug. 10, 2022.

*Primary Examiner* — Daniel G Mariam
(74) *Attorney, Agent, or Firm* — Sughrue Mion, PLLC

(57) ABSTRACT

The present invention relates to a technology, which generates individual life information so that the life cycle of a companion animal can be managed, and thus provides same to be usable for various services that can be provided for the companion animal, such as medical services and loss prevention services.

4 Claims, 9 Drawing Sheets

(51) Int. Cl.
| | |
|---|---|
| *G06Q 40/08* | (2012.01) |
| *G06V 10/25* | (2022.01) |
| *G06V 10/44* | (2022.01) |
| *G06V 10/74* | (2022.01) |
| *G06V 10/764* | (2022.01) |
| *G06V 10/774* | (2022.01) |
| *G06V 10/82* | (2022.01) |
| *G06V 40/10* | (2022.01) |
| *G06V 40/20* | (2022.01) |
| *G10L 17/02* | (2013.01) |
| *G10L 17/04* | (2013.01) |
| *G10L 17/18* | (2013.01) |
| *G10L 17/26* | (2013.01) |
| *G16H 10/60* | (2018.01) |
| *G06N 3/0464* | (2023.01) |

(52) U.S. Cl.
CPC .............. *G10L 17/18* (2013.01); *G10L 17/26* (2013.01); *G16H 10/60* (2018.01); *G06N 3/0464* (2023.01)

(56) References Cited

FOREIGN PATENT DOCUMENTS

| | | |
|---|---|---|
| KR | 10-2019-0070707 A | 6/2019 |
| KR | 10-2020-0041296 A | 4/2020 |
| KR | 10-2020-0042379 A | 4/2020 |
| KR | 10-2020-0072588 A | 6/2020 |
| KR | 10-2020-0123161 A | 10/2020 |
| KR | 10-2020-0136206 A | 12/2020 |
| KR | 10-2020-0142829 A | 12/2020 |
| KR | 10-2251434 B1 | 5/2021 |

* cited by examiner

[FIG. 1]
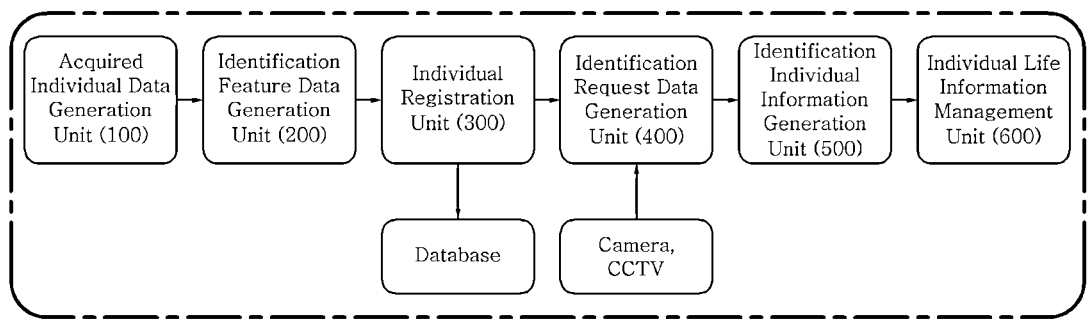
[FIG. 2]
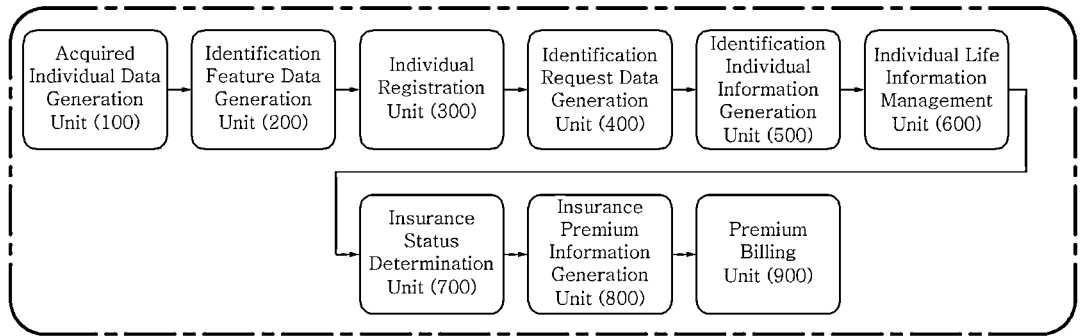

[FIG. 3]
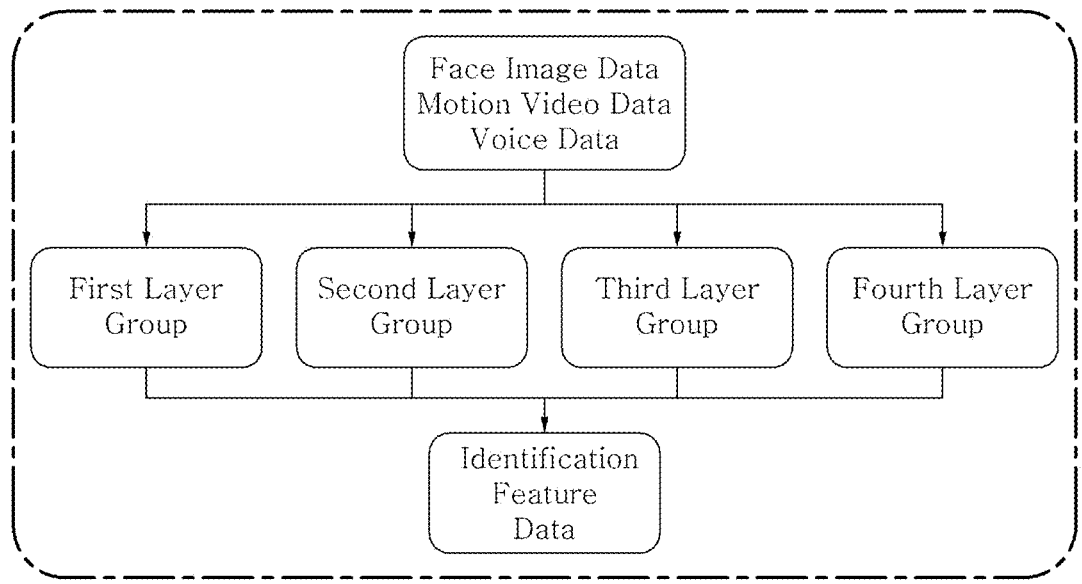
[FIG. 4]

[FIG. 5]
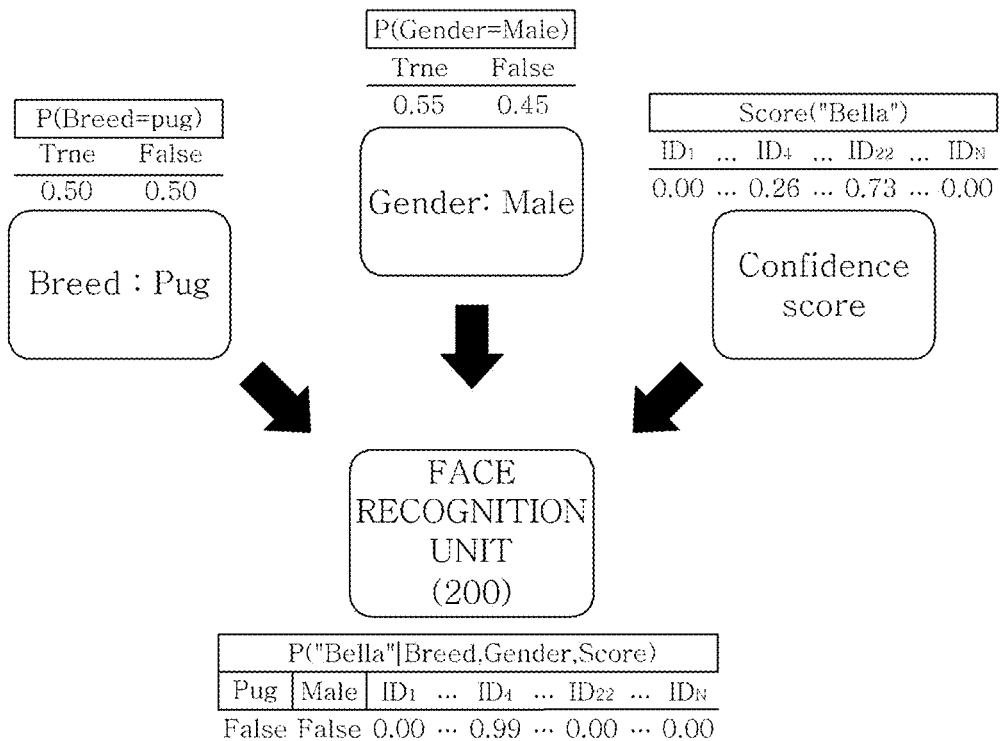
[FIG. 6]
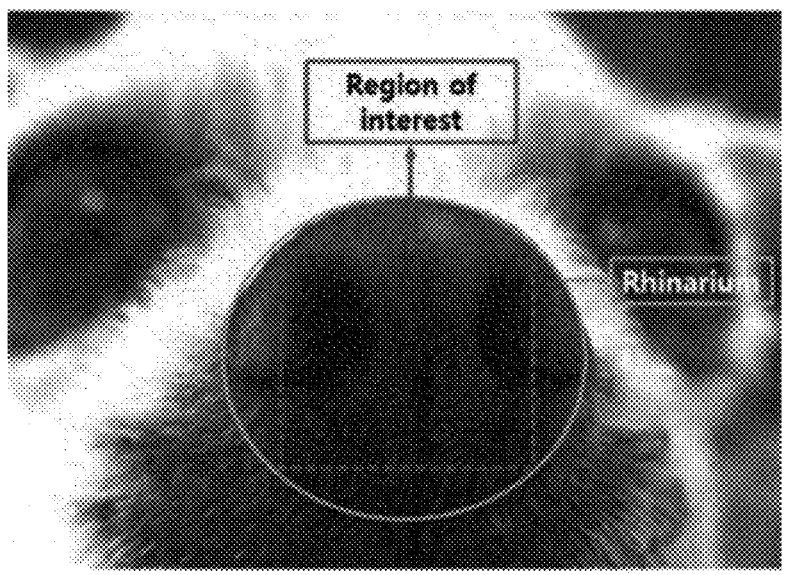

[FIG. 7]
a) 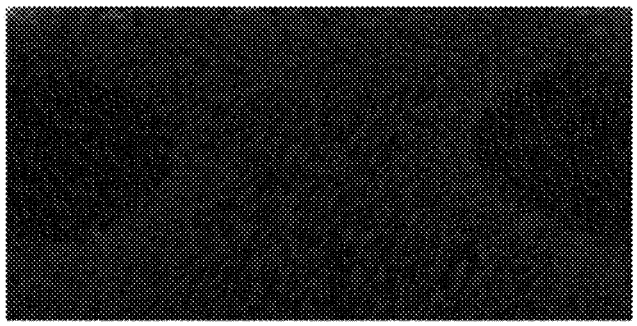
b) 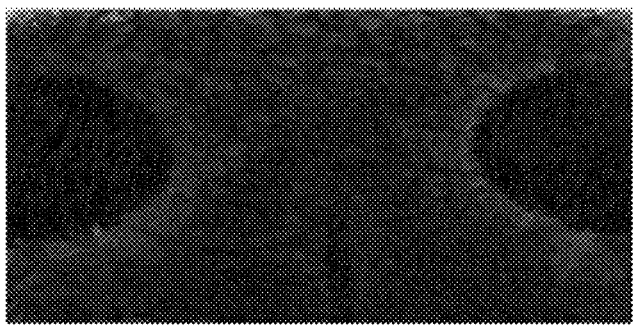
c) 

[FIG. 8]
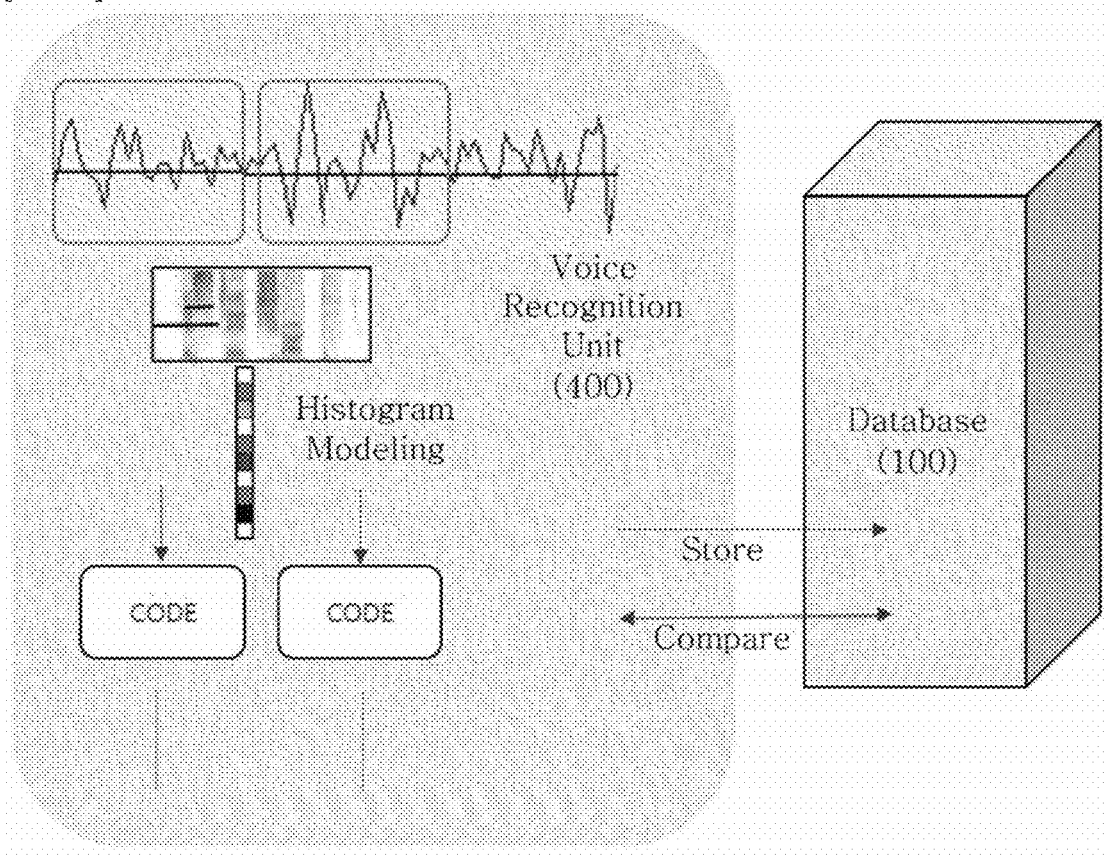
[FIG. 9]
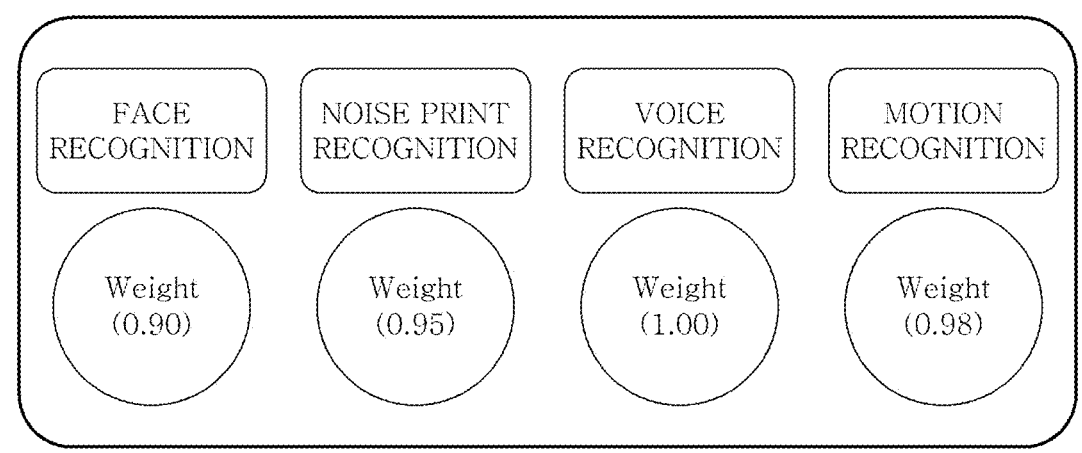

[FIG. 10]
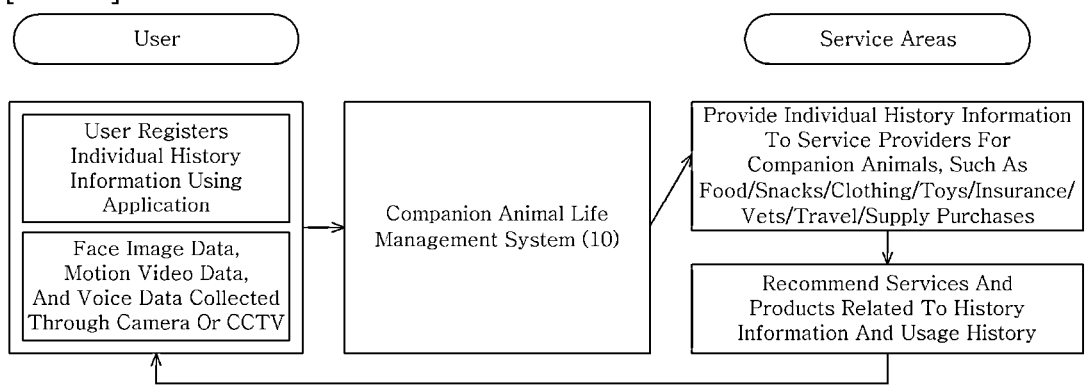

[FIG. 11]
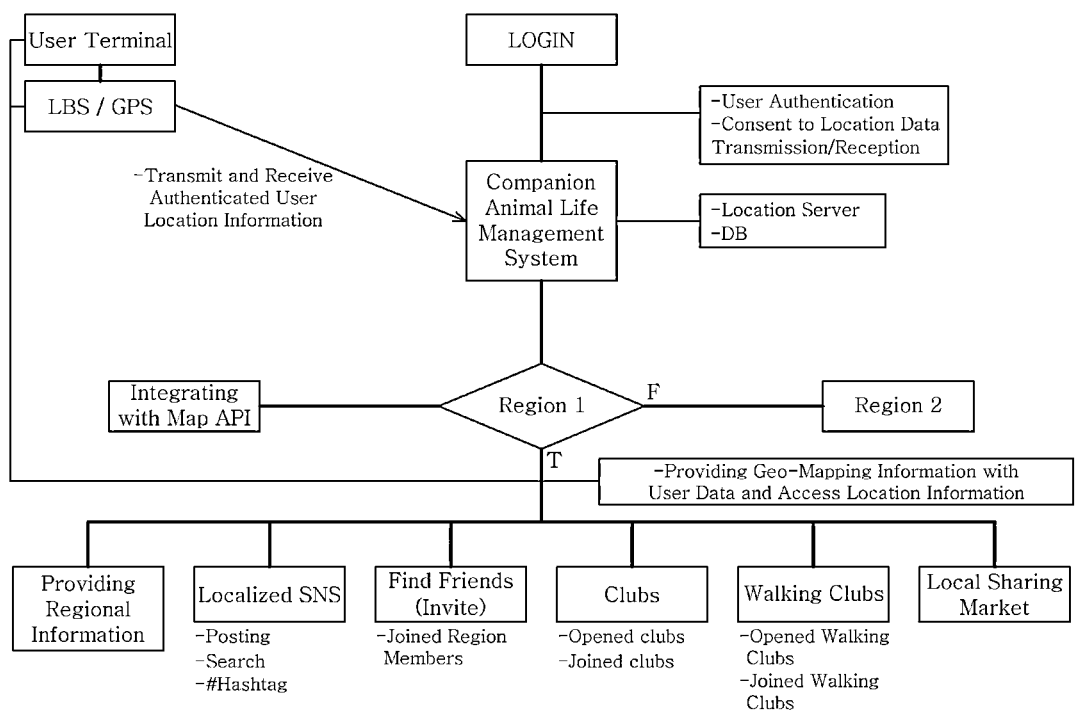

[FIG. 12]
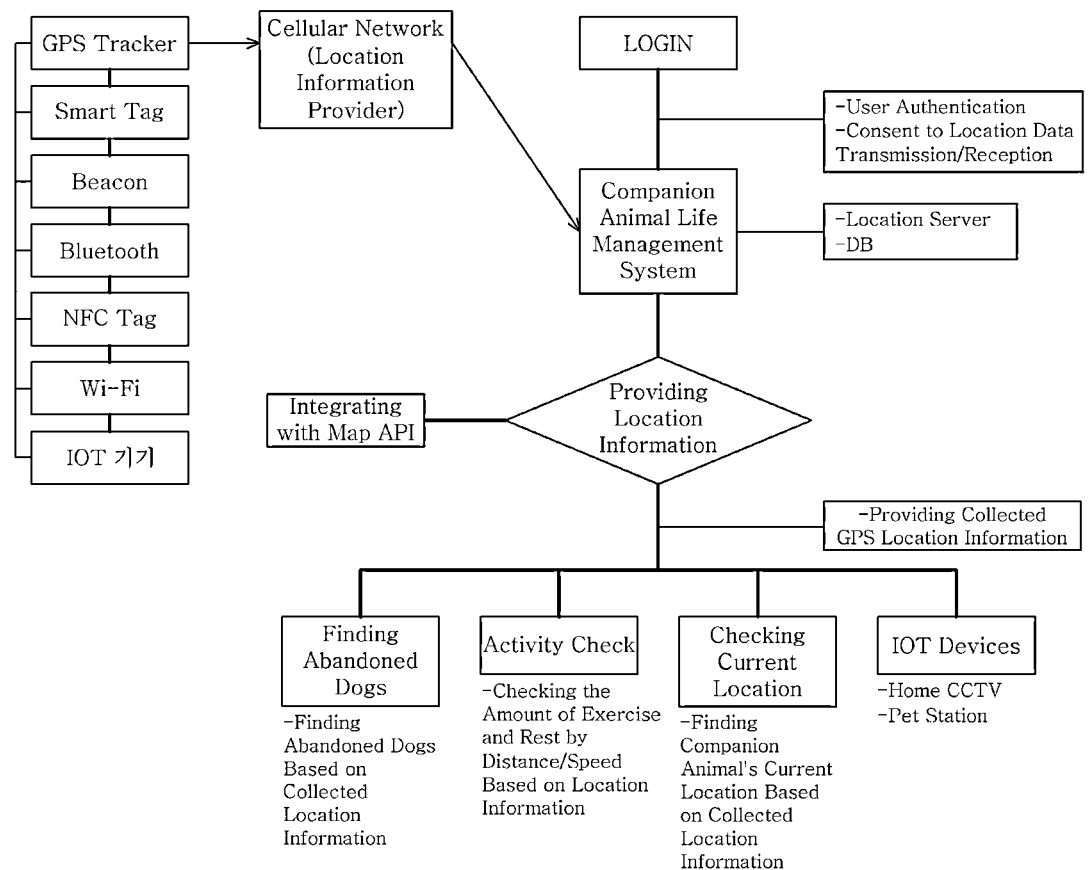

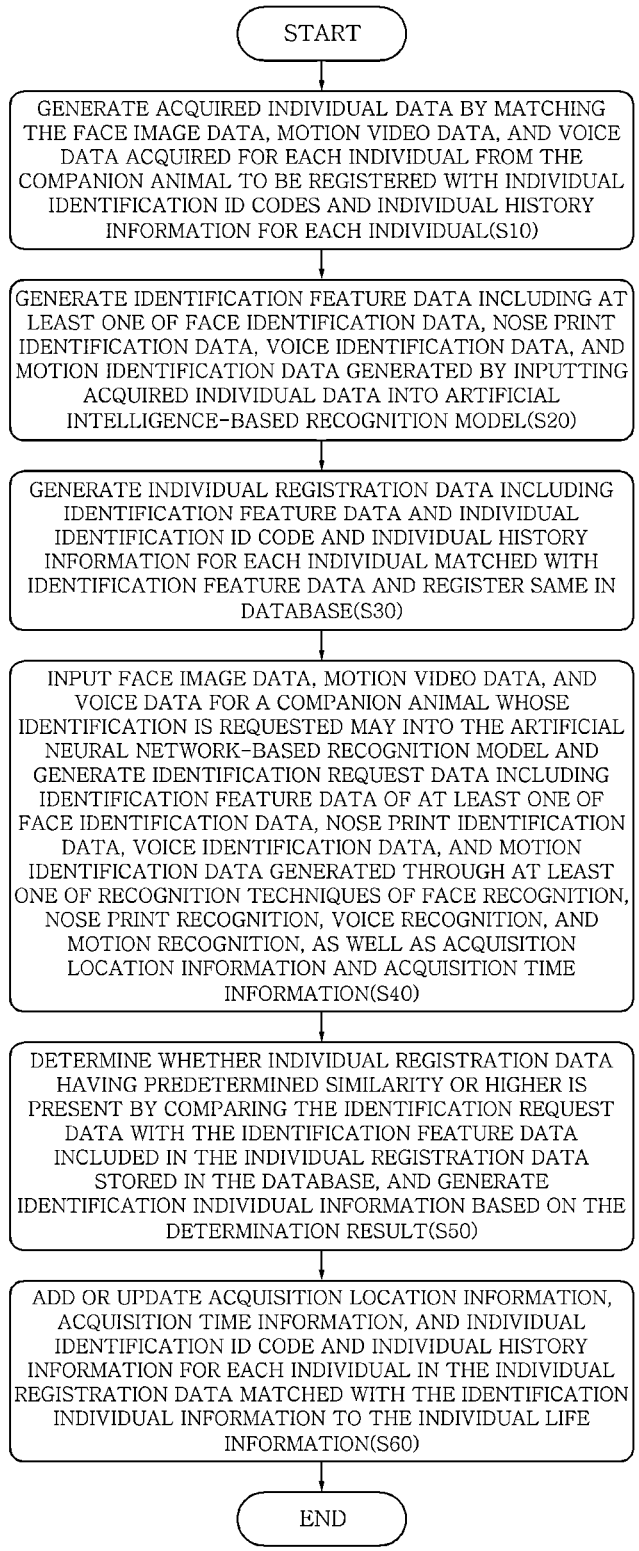

COMPANION ANIMAL LIFE MANAGEMENT SYSTEM AND METHOD THEREFOR

CROSS REFERENCE TO RELATED APPLICATIONS

This application is a National Stage of International Application No. PCT/KR2022/006158 filed Apr. 29, 2022, claiming priority based on Korean Patent Application No. 10-2021-0060776 Filed May 11, 2021, the entire disclosures of which are incorporated herein by reference.

TECHNICAL FIELD

The present disclosure relates to a technique for generating object life information for managing the life cycle of a companion animal so as to be used in various services that may be provided to the companion animal, such as medical services and loss prevention services. More particularly, the present disclosure relates to a companion animal life management system capable of generating individual acquisition data by matching face image data, motion video data, and voice data acquired from the companion animal on an individual basis with individual-specific individual identification ID codes and individual history information, and using the acquisition data to generate identification feature data and individual registration data that includes individual-specific individual identification ID codes and individual history information through at least one recognition technique among face recognition, nose print recognition, voice recognition, and motion recognition, registering the individual registration data in a database, generating individual request data by analyzing data acquired for a companion animal that has been requested to be identified, determining whether there is individual registration data having identification feature data having a certain similarity or higher with the identification request data, and generating identification individual information and individual life information according to the determination result, and a method therefor.

BACKGROUND ART

Recently, the demand for companion animals has exploded due to the effects of increasing nuclear families and leisure activities, and the number of companion animals is also increasing due to the growing interest in companion animals.

However, with the increase in the number of companion animals, there are frequent cases of companion animals being lost, and it is very difficult to find lost companion animals. Thus, there is a need for an animal registration system for systematic management of companion animals.

The animal registration system is a law that requires companion animal owners to register their companion animals with the city, county, or district office in order to minimize stray animals, and can be divided into two types: an internal type that inserts a wireless identification chip into the companion animal's body and an external type that hangs an identification tag with a wireless identification chip around the companion animal's neck.

However, the internal type is relatively less safe than the external type because it requires a procedure to implant a wireless identification chip into the companion animal's body. Further, the external type is relatively less convenient than the internal type because the identification tag must be managed so as not to be lost.

Therefore, as an alternative technology to the animal registration system, a technology that utilizes images of animal objects has been attracting attention. However, reflected light can be included in the object image due to the angle of the camera and light for photographing the object, and incorrect information can be extracted from the object image due to the reflected light included in the object image, causing the accuracy of object recognition to decrease.

Therefore, there is a growing need to improve the accuracy of object authentication by solving the above-mentioned problems in performing object authentication through images taken of animal objects.

Korean Patent Application No. 10-2019-0070707 discloses "METHOD AND DEVICE FOR AUTHENTICATING ANIMAL OBJECT USING FEATURE INFORMATION." This document discloses a technique for detecting a face area from image information, detecting feature areas for eyes, nose, ears, face lines, etc. from the face area, detecting feature information related to iris, nose print, and face from the feature areas, and performing authentication of an animal object based on an object authentication value calculated by applying respective weights to the feature information.

However, there is a disadvantage that the above-described configuration alone lacks accuracy compared to face recognition technology that is basically trained on human faces, and nose print recognition is difficult to commercialize because high reliability cannot be ensured using only the general method disclosed in the above document.

DISCLOSURE

Technical Problem

It is an object of the present disclosure to establish a system capable of generating individual life history information of a companion animal, identifying a companion animal whose identification is requested, and providing individual life history information of that companion animal. To this end, the present disclosure may provide a technique for increasing identification accuracy by storing feature information and an individual identification ID code and individual life history information about a companion animal in a database based on a technique for identifying an animal individual by performing at least one of face recognition, nose print recognition, voice recognition, and motion recognition, and performing normalization based on a plurality of training data including information about eight feature points extracted from a captured face image in face recognition, and performing training to identify a breed such as a dog or a cat and a gender based on the training data and a dataset generated by applying weights to the normalized training data.

In addition, for nose print recognition, by extracting a rectangular region of interest that includes the boundaries of the two nostrils of the companion animal, and performing contrast-limited adaptive histogram equalization and scale-invariant feature transform of on the region of interest to extract the nose print according to the inner Gaussian difference, a relatively high accuracy may be exhibited compared to recognizing the nose print through general feature point extraction and feature point contrast.

In addition, voice recognition may be performed by acquiring a code based on histogram modeling by analyzing voice data of a companion animal, and motion recognition may be performed by acquiring motion identification data for a structured pattern present in the movement of a companion animal by analyzing video data of the movement of the companion animal.

Using these recognition techniques, accurate identification of the companion animal may be performed, and the function of providing and managing the individual life history information about the identified companion animal may be provided based thereon.

Technical Solution

According to embodiments of the present disclosure, a companion animal life management system may include: an acquired individual data generation unit configured to generate acquired individual data by matching face image data, motion video data, and voice data acquired for each individual from a companion animal to be registered with an individual identification ID code and individual history information for each individual; an identification feature data generation unit configured to input the acquired individual data into an artificial neural network-based recognition model to generate identification feature data including at least one of face identification data, nose print identification data, voice identification data, or motion identification data generated through at least one recognition technique among face recognition, nose print recognition, voice recognition, or motion recognition; an individual registration unit configured to generate individual registration data including the identification feature data and an individual identification ID code and individual history information for each individual matched with the identification feature data and to register the individual registration data in a database; an identification request data generation unit configured to input the face image data, motion video data, and voice data for a companion animal whose identification is requested into the artificial neural network-based recognition model to generate identification request data including identification feature data of at least one of the face identification data, nose print identification data, voice identification data, or motion identification data generated through the at least one recognition technique among the face recognition, nose print recognition, voice recognition, or motion recognition, as well as the acquisition location information and acquisition time information; an identification individual information generation unit configured to determine whether individual registration data having a predetermined similarity or higher is present by comparing the identification request data with the identification feature data included in the individual registration data stored in the database and to generate identification individual information based on a result of the determination; and an individual life information management unit configured to manage the acquisition location information, the acquisition time information, and the individual identification ID code and individual history information for each individual included in the individual registration data matched with the identification individual information by adding or updating the same to individual life information.

According to one embodiment of the present disclosure, the artificial neural network-based recognition model may be formed as a convolutional neural network (CNN) and perform convolutional operations using a plurality of convolutional operation layers, wherein the plurality of convolutional operation layers may be divided into first, second, third, and fourth layer groups, each including a plurality of layers, wherein the first layer group may extract a plurality of feature points from the acquired face image data, and inputs the extracted plurality of feature points into an artificial neural network-based face identification model to generate face identification data for identifying a face considering a breed or gender, wherein the second layer group may extract, from the face image data, a rectangle-shaped region of interest included in a circle having a diameter of 10 to 15 cm that includes boundaries of two nostrils of the companion animal, and perform contrast-limited adaptive histogram equalization and scale-invariant feature transform on the region of interest to extract feature points according to an inner Gaussian difference to generate the nose print identification data, wherein the third layer group may segment the voice data into a plurality of frames according to a preset reference value, extract a feature vector for the segmented frames, perform histogram modeling to acquire a code according to the histogram modeling, and generate the voice identification data including the code according to the histogram modeling, and wherein the fourth layer group may segment video data into a plurality of consecutive frames according to a preset reference, and analyze the plurality of frames to generate the motion identification data for a structured pattern present in a motion of the companion animal.

According to one embodiment of the present disclosure, the first layer group may be configured to: extract eight feature points from a captured face image, the eight feature points comprising a center point of a left eyeball, a center point of a right eyeball, a nose, an end point of a left ear, an end point of a right ear, a right contact point of the left ear and a forehead, a left contact point of the right ear and the forehead, and a top center end point of the forehead; perform normalization based on a plurality of training data from which the eight feature points are extracted, and an artificial neural network-based face identification model to identify a breed and gender upon inputting of feature point information based on a dataset generated by applying weights to the training data and the normalized training data, and to generate face identification data for identifying an object by inputting the identified breed and gender and image data of the region of interest to increase identification accuracy; and calculate an optimal weight for the training data and the normalized training data based on an average accuracy and a corrected accuracy obtained based on the number of images determined as correct and the number of images determined as incorrect as a result of identifying the breed and gender through the artificial neural network-based face identification model.

According to one embodiment of the present disclosure, the system may be configured to: perform a convolutional operation through a plurality of convolutional layers based on information about the eight feature points extracted from an image of the region of interest to derive breed identification information and gender identification information about the identified breed and gender; and generate individual identification information by performing a convolutional operation through a plurality of convolutional layers based on the breed identification information, gender identification information, and information about the extracted feature points, and calculate a confidence score for the individual identification information based on the individual identification information, and calculate a predictability of the face identification data based on the confidence score for the individual identification information, the breed identification information, and the gender identification information.

According to one embodiment of the present disclosure, the system may further include: an insurance status determination unit configured to provide individual life information matching the companion animal requested to be identified, and to determine whether the companion animal is insured based on the individual history information included in the individual life information; an insurance premium information generation unit configured to calculate, when it is determined that the companion animal is not insured, an insurance premium to be incurred based on the individual history information included in the individual life information, and to provide insurance premium information generated based on the calculated insurance premium; and a premium billing unit configured to receive, when it is determined that the companion animal is insured, an input of a disease code and medical billing information, and automatically bill an insurance company for the insurance premium according to the disease code.

Advantageous Effects

A companion animal life management system implemented in accordance with embodiments of the present disclosure may be used to generate individual life information to manage the life cycle of a companion animal such that it can be used for various services that may be provided to the companion animal, such as medical services and loss prevention services. To this end, the reliability of individual identification of a companion animal may be greatly improved by simultaneously or sequentially using at least one identification method among face recognition, nose print recognition, voice recognition, and motion recognition by analyzing the video, image, and voice collected for the companion animal. In particular, by using an identification method that reflects identification information about the breed and gender of the companion animal to increase the recognition rate of face recognition performed on animals, a face recognition function with much higher accuracy than the conventional technology may be provided.

In addition, in nose print recognition, more reliable nose print recognition may be performed by performing contrast-limited adaptive histogram equalization and scale-invariant feature transform on a rectangular region of interest that includes the boundaries of a companion animal's two nostrils. In speech recognition, the reliability of speech recognition may be improved by extracting feature vectors and performing histogram modeling. Also, in motion recognition, motion identification data for structured patterns may be used to compensate for weaknesses in face recognition, nose print recognition, and speech recognition.

By providing individual life information of the identified companion animal, it may be used as basic information for medical services or various services that can be provided through the history information about the companion animal, which may provide an advantage in building a platform and various related business models.

DESCRIPTION OF DRAWINGS

FIG. 1 is a detailed block diagram of a companion animal life management system implemented according to a first embodiment of the present disclosure.

FIG. 2 is a detailed block diagram of a companion animal life management system implemented according to a second embodiment of the present disclosure.

FIG. 3 is a diagram illustrating a first, second, third, and fourth layer group of an artificial neural network-based recognition model formed as a convolutional neural network (CNN), according to one embodiment of the present disclosure.

FIG. 4 illustrates eight feature points extracted for face recognition of a companion animal according to one embodiment of the present disclosure.

FIG. 5 is a diagram illustrating a process for calculating the predictability of face identification data using a confidence score of object identification information, breed identification information, and gender identification information according to one embodiment of the present disclosure.

FIG. 6 illustrates a process for extracting a region of interest from a nose image according to one embodiment of the present disclosure.

FIG. 7 shows a contrast between an original image and images that have undergone contrast-limited adaptive histogram equalization of a region of interest according to one embodiment of the present disclosure.

FIG. 8 illustrates extracting a feature vector from a frame of segmented speech data and performing histogram modeling to acquire a code according to one embodiment of the present disclosure.

FIG. 9 is a diagram illustrating generating object identification information by applying a weight to determination information according to one embodiment of the present disclosure.

FIG. 10 is a diagram illustrating connection between a companion animal life management system implemented according to one embodiment of the present disclosure, and a user terminal and a provider server.

FIG. 11 is a diagram illustrating a location-based local community service implementable using a companion animal life management system implemented according to one embodiment of the present disclosure.

FIG. 12 is a diagram illustrating a companion animal IOT service implementable using a companion animal life management system implemented according to one embodiment of the present disclosure.

FIG. 13 is a flowchart illustrating a companion animal identification method according to one embodiment of the present disclosure.

BEST MODE

Hereinafter, at least one embodiment of the present disclosure will be described in detail with reference to the accompanying drawings so that those skilled in the art can easily practice the present disclosure. The present disclosure may, however, be embodied in many different forms and should not be construed as limited to the embodiments set forth herein.

The terminology employed in this specification is merely used to describe specific embodiments and is not intended to limit the present disclosure. A singular expression includes a plural expression unless the context clearly dictates otherwise.

In this specification, the term "include" or "have" is intended to indicate that characteristics, figures, steps, operations, constituents, and components disclosed in the specification or combinations thereof exist. The term "include" or "have" should be understood as not pre-excluding possibility of existence or addition of one or more other characteristics, figures, steps, operations, constituents, components, or combinations thereof.

Unless defined otherwise, all terms used herein, including technical or scientific terms, have the same meaning as commonly understood by one of ordinary skill in the art to which this present disclosure belongs.

Terms such as those defined in commonly used dictionaries should be interpreted as having a meaning that is consistent with their meaning in the context of this specification and the relevant art and will not be interpreted in an idealized or overly formal sense unless expressly so defined herein.

It will be appreciated that each block of the processing flowchart illustrations and combinations of the flowchart illustrations may be performed by computer program instructions. These computer program instructions may be mounted on a processor of a general purpose computer, a special purpose computer, or other programmable data processing equipment, such that the instructions, when executed by the processor of the computer or other programmable data processing equipment, create means for performing the functions described in the flowchart block(s).

These computer program instructions may be stored in a computer-available or computer-readable memory that may be directed to a computer or other programmable data processing equipment to implement the functions in a particular manner, such that the instructions stored in the computer-available or computer-readable memory may produce an article of manufacture including instruction means for performing the functions described in the flowchart block(s).

The computer program instructions may also be loaded onto a computer or other programmable data processing equipment to perform a sequence of operational steps on the computer or other programmable data processing equipment to create a computer-executable process, such that the instructions for performing the computer or other programmable data processing equipment provide steps for performing the functions described in the flowchart block(s).

Further, each block may represent a module, segment, or portion of code including one or more executable instructions for performing a specified logical function(s).

It should also be noted that in some alternative implementations, the functions noted in the blocks may occur out of sequence. For example, two blocks shown one after the other may in fact be performed substantially simultaneously, or the blocks may sometimes be performed in reverse order according to the functions they perform.

As used herein, the term "unit" refers to software or a hardware component, such as a field-programmable gate array (FPGA) or an application-specific integrated circuit (ASIC), wherein the "unit" performs some functions.

However, the "unit" is not limited to software or hardware. The "unit" may be configured to be present on an addressable storage medium and may be configured to execute one or more processors.

Thus, in one example, the "unit" includes components such as software components, object-oriented software components, class components, and task components, processes, functions, attributes, procedures, subroutines, segments of program code, drivers, firmware, microcode, circuits, data, databases, data structures, tables, arrays, and variables. The functions provided in the components and units may be combined into a smaller number of components and units or further separated into additional components and units. In addition, the components and units may be implemented to execute one or more CPUs in the device or secure multimedia card.

In describing the embodiments of the present disclosure in detail, reference will be made to examples of specific systems, but the main points claimed herein are applicable to other communication systems and services having a similar technical background without departing substantially from the scope disclosed herein, as will be apparent to those skilled in the art.

Hereinafter, a companion animal life management system and a method therefor according to an embodiment of the present disclosure will be described with reference to the drawings.

FIG. 1 is a detailed block diagram of a companion animal life management system 10 implemented according to a first embodiment of the present disclosure.

Referring to FIG. 1, a companion animal life management system 10 implemented according to a first embodiment may include an acquired individual data generation unit 100, an identification feature data generation unit 200, an individual registration unit 300, an identification request data generation unit 400, an identification individual information generation unit 500, and an individual life information management unit 600.

The acquired individual data generation unit 100 may generate acquired individual data by matching face image data, motion video data, and voice data acquired for each individual from a companion animal to be registered with an individual identification ID code and individual history information for each individual.

According to one embodiment of the present disclosure, the face image data, motion video data, and voice data may be acquired for the companion animal to be registered using devices such as a camera, CCTV, and a microphone.

According to one embodiment of the present disclosure, the individual identification ID code may mean a code consisting of certain letters or numbers to identify the companion animal to be stored when registering the companion animal.

According to one embodiment of the present disclosure, the individual history information may include the breed, date of birth, age of the companion animal, residence information, health information, veterinary care information, product preference, product in use, or grocery information.

The identification feature data generation unit 200 may input the acquired individual data into an artificial neural network-based recognition model to generate identification feature data including at least one of face identification data, nose print identification data, voice identification data, or motion identification data generated through at least one recognition technique among face recognition, nose print recognition, voice recognition, or motion recognition.

According to one embodiment of the present disclosure, the artificial neural network-based recognition model may be a computational model based on an artificial neural network, and may be formed as a convolutional neural network (CNN), but is not limited to.

According to one embodiment of the present disclosure, the artificial neural network-based recognition model may be formed as a CNN, which performs convolutional operations using a plurality of convolutional computation layers. The plurality of convolutional computation layers may be divided into first, second, third, and fourth layer groups, each including a plurality of layers.

According to the above embodiment, the first, second, third, and fourth layer groups may implement functions of face recognition, nose print recognition, voice recognition, and motion recognition, respectively, as will be described in more detail with reference to FIG. 3.

According to one embodiment of the present disclosure, the identification feature data may mean data including information about features by which an individual can be recognized according to each recognition method. The identification feature data may be generated to include at least one of face identification data, nose print identification data, voice identification data, and motion identification data generated through an artificial neural network-based recognition model.

The individual registration unit 300 may generate individual registration data including the identification feature data and an individual identification ID code and individual history information for each individual matched with the identification feature data, and may register the individual registration data in a database.

According to one embodiment of the present disclosure, the individual registration data including the identification feature data and the individual identification ID code and individual history information for each individual matched with the identification feature data may be generated.

According to one embodiment of the present disclosure, the individual registration data may be registered by storing the individual registration data in the database. The database may be implemented in the form of a repository or server located within or outside the companion animal life management system 10.

The identification request data generation unit 400 may input the face image data, motion video data, and voice data for a companion animal whose identification is requested into the artificial neural network-based recognition model to generate identification request data including identification feature data of at least one of the face identification data, nose print identification data, voice identification data, or motion identification data generated through the at least one recognition technique among the face recognition, nose print recognition, voice recognition, or motion recognition, as well as the acquisition location information and acquisition time information.

According to one embodiment of the present disclosure, the face image data, motion video data, and voice data acquired through a camera, CCTV, a microphone, or the like may be analyzed through at least one of the recognition techniques of face recognition, nose print recognition, voice recognition, and motion recognition using an artificial neural network-based recognition model, thereby generating identification feature data of at least one of the face identification data, nose print identification data, voice identification data, and motion identification data.

According to one embodiment of the present disclosure, identification feature data may be generated by inputting face determination information, nose print determination information, and voice determination information into an artificial neural network-based individual identification model. In generating the identification feature data based on the face determination information, nose print determination information, and voice determination information, the identification feature data may be generated by calculating and applying a weight to each of the face determination information and nose print determination information, thereby improving identification accuracy.

The identification individual information generation unit 500 may determine whether individual registration data having a predetermined similarity or higher is present by comparing the identification request data with the identification feature data included in the individual registration data stored in the database, and generate identification individual information based on a result of the determination.

According to one embodiment of the present disclosure, the identification feature data including at least one of face identification data, nose print identification data, voice identification data, and motion identification data for an individual whose identification is requested, and the individual registration data including at least one of face identification data, nose print identification data, voice identification data, and motion identification data stored in the database may be used to determine whether individual registration data having a predetermined similarity or higher is present for each of the face identification data, nose print identification data, voice identification data, and motion identification data to generate the identification individual information.

The individual life information management unit 600 may manage the acquisition location information, the acquisition time information, and the individual identification ID code and individual history information for each individual included in the individual registration data matched with the identification individual information by adding or updating the same to the individual life information.

According to one embodiment of the present disclosure, individual life information may be generated based on individual identification ID code and individual history information for each individual in the individual registration data that has similarity to the identification feature data of the companion animal whose identification is requested. If there is existing individual life information, addition or updating may be performed.

FIG. 2 is a detailed block diagram of a companion animal life management system implemented according to a second embodiment of the present disclosure.

Referring to FIG. 2, a companion animal life management system 11 implemented according to the second embodiment may include an insurance status determination unit 700, an insurance premium information generation unit 800, and a premium billing unit 900 in addition to the companion animal life management system 10 implemented according to the first embodiment.

The insurance status determination unit 700 may provide individual life information matching the companion animal requested to be identified, and may determine whether the individual is insured based on individual history information included in the individual life information.

According to one embodiment of the present disclosure, the individual life information matching the companion animal whose identification is requested may be transmitted to a user or to a management server of a business operating a companion animal-related service, and whether the individual is insured may be determined based on the individual history information included in the individual life information.

According to one embodiment of the present disclosure, whether the individual has an animal insurance policy may be determined based on the insurance purchase history information included in the individual life information.

When the insurance premium information generation unit 800 determines that the companion animal is not insured, the insurance premium information generation unit 800 may calculate the insurance premium to be incurred when the individual is insured based on the individual history information included in the individual life information, and may provide insurance premium information generated based on the calculated insurance premium.

According to one embodiment of the present disclosure, when it is determined that the individual is not insured, insurance premium information may be generated and provided to allow the individual to purchase an animal health insurance product for the purpose of receiving medical treatment at a veterinary hospital and paying insurance premiums for the billed medical treatment.

According to one embodiment of the present disclosure, in order to generate the insurance premium information, the insurance premium information required for the companion animal to purchase animal insurance may be generated based on preset insurance fee information.

When it is determined that the companion animal is insured, the premium billing unit 900 may receive an input of a disease code and medical billing information and automatically bill the insurance company for the insurance premium according to the disease code.

According to one embodiment of the present disclosure, when the companion animal is insured with animal insurance, the disease code and medical billing information may be received from a server of the veterinary hospital, and the insurance premium that can be charged may be calculated based on the disease code and medical billing information. The calculated insurance premium may be charged to the insurance company.

FIG. 3 is a diagram illustrating a first, second, third, and fourth layer group of an artificial neural network-based recognition model formed as a convolutional neural network (CNN), according to one embodiment of the present disclosure.

Referring to FIG. 3, an artificial intelligence-based recognition model according to one embodiment of the present disclosure is formed as a convolutional neural network (CNN) and performs convolutional operations using a plurality of convolutional operation layers. The plurality of convolutional operation layers may be divided into first, second, third, and fourth layer groups, each including a plurality of layers. The first, second, third, and fourth layer groups may perform the functions of face recognition, nose print recognition, voice recognition, and motion recognition through respective convolutional operations.

According to one embodiment of the present disclosure, the first layer group of the artificial intelligence-based recognition model may extract a plurality of feature points from the acquired face image data, and input information about the extracted plurality of feature points to the artificial neural network-based face identification model to generate face identification data that enables face identification considering the breed or gender.

According to one embodiment of the present disclosure, as a preprocessing step for extracting feature points and performing feature point analysis using an artificial neural network-based face identification model, a face image may be generated by first searching for the face of a companion animal and capturing the found image identified as a face.

According to one embodiment of the present disclosure, multiple feature points may be extracted from the captured face image. In order to minimize the consumption of computing resources and reduce the extraction time in extracting the features, the number of features to be extracted may be limited to a small number.

According to one embodiment of the present disclosure, when the number of features to be extracted is limited to a small number, the recognition accuracy must be maintained at or above a certain level while extracting a small number of features. Therefore, it is necessary to select features at advantageous positions to identify the face shape of the animal. Depending on the positions of the features, the amount of computing resources required to recognize the face, the recognition speed, and the recognition accuracy may vary greatly.

According to one embodiment of the present disclosure, a multi-object recognition technique may be used to extract the feature points. Among such techniques, the Oriented FAST and Rotated BRIEF (ORB) algorithm may be employed.

According to the above embodiment, a window region may be taken and the brightness value of the center point may be compared with 16 brightness values. For example, the brightness values located at 1, 5, 9, and 13 may first be compared and assigned a value of 1 when dark or bright and 0 when similar, and points with a value greater than 3 may be selected as candidate feature points.

Then, the remaining brightness values are compared to determine a point as a feature point when the value is greater than or equal to 12, and a pixel with the greatest value among 8 neighbor pixels around each feature point is determined as the final feature point. To remove blob feature points from the feature points and extract corner feature points, Hans Corner Detection can be utilized.

In this case, since Hans Corner Detection can recognize the corner area, only the corner can be extracted, and furthermore, the direction can be determined using the Intensity Centroid to obtain the main direction.

According to the above embodiment, creating a partial image around each feature point, rotating all comparison points using the main direction, and constructing a bit string description is less informative and differentiating.

To address this issue, $p(x)$ and $p(y)$ are not arbitrarily determined, but two pixel selection patterns with good informativeness and discrimination may be determined and made into training data, and 256 binary tests may be obtained based on the training data to generate descriptors.

According to one embodiment of the present disclosure, the first layer group extracts eight feature points from the captured face image. The eight extracted points may include a center point of a left eyeball, a center point of a right eyeball, a nose, an end point of a left ear, an end point of a right ear, a right contact point of the left ear and a forehead, a left contact point of the right ear and the forehead, and a top center end point of the forehead.

According to the above embodiment, the identification accuracy may be increased by performing normalization based on multiple training data from which the eight feature points are extracted, and training an artificial neural network-based face identification model to identify a breed and gender upon inputting of feature point information based on a dataset generated by applying weights to the training data and the normalized training data, and to generate face identification data for identifying an object by inputting the identified breed and gender and image data of the region of interest.

According to one embodiment of the present disclosure, as a result of identifying the breed and gender through the artificial neural network-based face identification model, an optimal weight for the training data and the normalized training data may be calculated based on an average accuracy and a corrected accuracy obtained based on the number of images determined as correct and the number of images determined as incorrect.

According to one embodiment of the present disclosure, in a simulation of face recognition by extracting a small number of feature points for both dogs and cats, at least eight feature points should be extracted in order to obtain a recognition rate of more than 75.32%. In particular, when the eight extracted feature points are the center point of the left eyeball, the center point of the right eyeball, the nose, the end point of the left ear, the end point of the right ear, the right contact point of the left ear and the forehead, the left contact point of the right ear and the forehead, and the top center end point of the forehead, as shown in FIG. 4, the simulation results show a face recognition rate of more than 93.21%.

According to one embodiment of the present disclosure, in order to secure a high identification accuracy in generating a dataset for training a face identification model based on an artificial neural network, normalization is performed on the training data as shown in Equation 1 below, and the identification accuracy is calculated when the training data and the normalized training data are used for training. Then, based on the identification accuracy, the optimal weight is calculated and applied to use a weighted average between the training data and the normalized training data by training through the dataset generated by the training data and the normalized training data.

$$P(\text{Decision}) = \alpha \times P(D_{raw}) + (1 - \alpha) \times P(D_{normalized}) \quad \text{[Equation 1]}$$

$$\text{average} = \frac{TP}{FN + TP}$$

$$\text{balance} = \frac{1}{N} \sum_{i}^{N} \frac{TP_i}{FN_i + TP_i}$$

In Equation 1, P(Decision) may denote the identification accuracy of the identification model trained based on the generated dataset, $P(D_{raw})$ may denote the identification accuracy of the training data, $P(D_{normalized})$ may denote the identification accuracy of the normalized training data, and a may denote the weight index.

For all images included in the training data and the normalized training data, TP may denote the number of images determined as correct, FN may denote the number of images determined as incorrect, and FN+TP may denote the total number of images. For correction of accuracy, i may denote the selected class (breed or gender) and N may denote the total number of classes.

average may denote average accuracy, which may mean an average accuracy obtained based on the number of correctly predicted breeds and genders, and balance may denote corrected accuracy, which may mean an average accuracy between breeds, regardless of the number of images within each breed and gender.

According to one embodiment of the present disclosure, when the number of images evaluated for each class is the same, the average accuracy and the corrected accuracy should be the same. However, there is a difference between these accuracies due to the unbalanced number of images among the classes. To resolve this issue, the average accuracy and the corrected accuracy may be obtained based on the number of images determined as correct and the number of images determined as incorrect as a result of identifying the breed and gender, and the optimal weight index may be calculated such that the two accuracies are equalized. The calculated weight index may be applied to the training data and the normalized training data.

According to the above embodiments, the simulation results show that the weight index a has a high identification accuracy in the range of 0.38<α<0.73, and that, on average, the weight index a tends to have a high identification accuracy as it approaches 0.5.

According to one embodiment of the present disclosure, a may be preset to 0.5, and may be updated by calculating an optimal weight index such that the average accuracy and corrected accuracy are uniform.

According to one embodiment of the present disclosure, the identified breed and gender information and the region of interest image data may be input to an artificial neural network-based face identification model to train the model to generate face identification data for identifying an individual, thereby increasing the identification accuracy.

According to one embodiment of the present disclosure, the artificial neural network-based face identification model may be formed as a convolutional neural network (CNN), which may perform convolutional operations with multiple convolutional operation layers, and may be structured as a first layer group and a second layer group by dividing some of the convolutional operation layers and the remaining part.

According to one embodiment of the present disclosure, information about the extracted feature points may be input to the first layer group of the artificial neural network-based face identification model to primarily derive breed identification information and gender identification information.

According to one embodiment of the present disclosure, information about eight feature points including the center point of the left eyeball, the center point of the right eyeball, the nose, the end point of the left ear, the end point of the right ear, the right contact point of the left ear and the forehead, the left contact point of the right ear and the forehead, and the top center end point of the forehead extracted from the image of the region of interest may be input to an input layer of the first layer group of the artificial neural network-based face identification model, and convolutional operations may be performed through multiple convolutional layers to derive breed identification information and gender identification information about the identified breed and gender.

According to one embodiment of the present disclosure, the output value of the first layer group of the artificial neural network-based face identification model and information about the extracted feature points are input to the input layer of the second layer group of the artificial neural network-based face identification model to generate object identification information, and a confidence score for the object identification information may be calculated based on the object identification information. The predictability of the face identification data may be calculated based on the confidence score of the object identification information, breed identification information, and gender identification information.

According to one embodiment of the present disclosure, the predictability of the face identification data may be calculated based on the confidence score of the object identification information, the breed identification information, and the gender identification information, as shown in Equation 2 below.

$$P(id \mid g, b; s) = \text{Score}(id) \times Ind_G(id; g) \times Ind_B(id; b) \quad \text{[Equation 2]}$$

$$Ind_G(id; g) = \begin{cases} 1 & \text{if identity matches the gender} \\ 0 & \text{otherwise} \end{cases}$$

$$Ind_B(id; b) = \begin{cases} 1 & \text{if identity matches the breed} \\ 0 & \text{otherwise} \end{cases}$$

Here, P(id|g, b; s) may denote the predictability of the face identification data, Score(id) may denote the confidence score of the object identification information, $Ind_G(id;g)$ may denote the gender identification information, $Ind_B(id;b)$ denote the breed identification information, and Z(g, b; s) may denote the normalization factor of each information.

According to one embodiment of the present disclosure, the second layer group of the artificial intelligence-based recognition model may extract, from the face image, a rectangle-shaped region of interest included in a circle having a diameter of 10 to 15 cm that includes boundaries of two nostrils of the companion animal, and perform contrast-limited adaptive histogram equalization and scale-invariant feature transform on the region of interest to extract feature points according to an inner Gaussian difference to generate the noise print identification data.

According to one embodiment of the present disclosure, a region of interest in the shape of a rectangle included in a circle with a diameter of 10 to 15 cm that includes the boundaries of two nostrils of a companion animal may be extracted from a face image, and contrast-limited adaptive histogram equalization and scale-invariant feature transform may be performed on the region of interest to extract the noise print according to the inner Gaussian difference to generate the noise print identification data.

According to one embodiment of the present disclosure, based on the noise print identification data, face determination information about whether a noise print data with a predetermined similarity or higher is present among the stored noise print data may be generated.

According to one embodiment of the present disclosure, in extracting a noise print from a region-of-interest image extracted from the face image, information loss may occur when the size of the region-of-interest image is excessively large or excessively small. Accordingly, resizing may be performed using Equation 3 below to perform image resizing while maintaining the width and height ratio of the original image.

$$S = \begin{cases} \dfrac{h}{w} & \text{if } w \leq h \\ \dfrac{w}{h} & \text{otherwise} \end{cases}$$ [Equation 3]

$$[w', h'] = \begin{cases} [r, r \times s] & \text{if } w \leq h \\ [r, r \times s] & \text{otherwise} \end{cases},$$

where S may denote a scale factor, w may denote a width, and h may denote a height, where w' may be a resized width and h' may be a resized height, r may be a reference value for resizing. According to one embodiment of the present disclosure, the reference value for resizing may be a size of 300×300 pixels or 300×400 pixels.

According to one embodiment of the present disclosure, contrast-limited adaptive histogram equalization may be performed on the resized region-of-interest image.

As used herein, histogram equalization refers to a representative image enhancement method that uses a cumulative distribution function of pixel values in an image. Conventional equalization increases the contrast of the entire image, resulting in many cases where the effect is not satisfactory.

According to one embodiment of the present disclosure, in order to overcome the limitations of the conventional equalization technique, equalization may be performed by applying the contrast-limited adaptive histogram equalization, which is a more advanced equalization technique.

Here, the contrast-limited adaptive histogram equalization refers to a technique that equalizes the histogram within each region by dividing the image into small regions and removing extreme noise using contrast limit. The contrast limit refers to a method of enhancing contrast more in darker areas and less in lighter areas.

In another embodiment of the present disclosure, the nose of a dog or cat, which makes up the majority of companion animals, is typically dark compared to the rest of the face, the image of the nose of a dog or cat, including the nose print, is often relatively low in contrast compared to the other images, and the same dog or cat may appear different in different images due to differences in lighting or illumination. Therefore, the contrast value can be adjusted by performing the contrast-limited adaptive histogram equalization to have a constant contrast level.

According to one embodiment of the present disclosure, the contrast-limited adaptive histogram equalization may be performed iteratively until the histogram is sufficiently stretched to reduce contrast differences between images and improve contrast. More specifically, it may be performed iteratively until more than 1000 pixels can be identified for a region-of-interest image.

According to one embodiment of the present disclosure, a feature extraction algorithm such as SIFT, SURF, BRISK, or ORB may be used to extract the feature points, and a keypoint detector and a descriptor may be used to find keypoints in the image, and a scriptor may generate information describing the keypoints.

According to one embodiment of the present disclosure, the noise print identification data may be generated by performing scale-invariant feature transform (SIFT) and extracting feature points based on the inner Gaussian difference.

According to the above embodiment, multiple image scale spaces may be generated by performing the SIFT, and feature points may be extracted by searching for a maximum edge as a keypoint in the space through a difference of Gaussian (DoG) detector as shown in Equation 4 below. Thereby, noise print identification data may be generated.

$$D(x,y,\sigma) = (G(x,y,k\sigma) - G(x,y,\sigma)) * I(x,y)$$ [Equation 4]

In Equation 4, D(x, y, σ) may denote the DoG, G may denote a Gaussian function, I may denote an image from which a feature point is to be extracted, and *I(x, y) may denote a convolution of the difference between the image and the Gaussian function value.

According to one embodiment of the present disclosure, the third layer group of the artificial intelligence-based recognition model may segment the voice data into a plurality of frames according to a preset reference value, extract a feature vector for the segmented frames to perform histogram modeling to acquire a code according to the histogram modeling, and generate voice identification data including the code according to the histogram modeling.

The acquired voice data of the companion animal may be segmented into multiple frames according to a preset reference value, and feature vectors may be extracted from the segmented frames to perform histogram modeling. Then, a code may be acquired according to the histogram modeling.

According to one embodiment of the present disclosure, multiple frames may be generated by segmenting the acquired voice data of a companion animal by a certain length according to a preset reference value, and histogram modeling may be performed to extract a feature vector from each of the frames to create a histogram model, and a code may be generated according to the shape of the histogram model formed through histogram modeling.

Here, the histogram modeling means that the envelope constituted by the histogram of the defect signal information by normalizing the sound emission signal to 256 steps is modeled as a feature, and the features of the modeled envelope are extracted from the modeled defect signal using partial autocorrelation coefficients (PARCOR), and the features representing the unique characteristics of the defect signal are selected by the distance evaluation technique (DET) to generate an identifiable code.

According to one embodiment of the present disclosure, voice identification data may be generated to include the generated code, and voice determination information may be generated by determining whether a code of voice data having a predetermined similarity or higher is present among the codes of voice data stored in the database.

According to one embodiment of the present disclosure, the fourth layer group may segment acquired video data into multiple consecutive frames based on a preset reference and analyze the multiple frames to generate motion identification data for a structured pattern present in the motion of the companion animal.

According to one embodiment of the present disclosure, in generating motion identification data, the multiple frames may be analyzed to identify a motion of a companion animal, and the motion dynamics of the motion over a period of time may be analyzed and the repeated motion dynamics of the motion may be stored as a structured pattern, and motion identification data including information about the stored structured pattern may be generated.

FIG. 4 illustrates eight feature points extracted for face recognition of a companion animal according to one embodiment of the present disclosure.

Referring to FIG. 4, which shows eight feature points extracted for face recognition of a companion animal according to one embodiment of the present disclosure, a face image may be captured by searching for the face of the companion animal, and eight feature points may be extracted from the center point of the left eyeball, the center point of the right eyeball, the nose, the end point of the left ear, the end point of the right ear, the right contact point of the left ear and the forehead, the left contact point of the right ear and the forehead, and the top center point of the forehead in the captured face image.

FIG. 5 is a diagram illustrating a process for calculating the predictability of face identification data using a confidence score of identification feature data, breed identification information, and gender identification information according to one embodiment of the present disclosure.

According to one embodiment of the present disclosure, the first layer group of the artificial intelligence-based recognition model may calculate the predictability of the face identification data based on the confidence score of the identification feature data, the breed identification information, and the gender identification information. For example, it may calculate the predictability of the face identification data as shown in Equation 2 by reflecting the probability of a correct or incorrect answer when the identified breed is a pug, the probability of a correct or incorrect answer when the identified gender is a male, and the confidence score given when the identified object is a companion animal "Bella."

FIG. 6 is a diagram illustrating a process for extracting a region of interest from a nose image, according to one embodiment of the present disclosure.

Referring to FIG. 6, which illustrates extracting a region of interest from a nose image according to one embodiment of the present disclosure, a region of interest in the shape of a rectangle included in a circle with a diameter of 10 to 15 cm that includes the boundaries of two nostrils of a companion animal may be extracted from the face image.

FIG. 7 shows a contrast between an original image and images that have undergone contrast-limited adaptive histogram equalization of a region of interest according to one embodiment of the present disclosure.

FIG. 7 shows an original image and an image obtained by performing contrast-limited adaptive histogram equalization on the region of interest according to one embodiment of the present disclosure. In a) of FIG. 7, the original image is obtained without performing equalization on the region of interest and is very dark and insufficiently bright to identify pixels.

Therefore, when contrast-limited adaptive histogram equalization is performed on such an original image, the contrast becomes relatively brighter, increasing the number of identified pixels, as shown in b) of FIG. 7. Repeating the contrast-limited adaptive histogram equalization until more than 1000 pixels can be identified may facilitate the extraction of feature points with brighter contrast, as shown in c) of FIG. 7.

FIG. 8 illustrates extracting a feature vector from a frame of segmented speech data and performing histogram modeling to acquire a code according to one embodiment of the present disclosure.

Referring to FIG. 8, it is illustrated that a code is obtained by extracting a feature vector and performing histogram modeling on a frame of segmented speech data according to one embodiment of the present disclosure, wherein a feature of a modeled envelope is extracted from a modeled fault signal using a partial correlation coefficient, and a feature representing a characteristic unique to the fault signal is selected by DET to generate an identifiable code.

FIG. 9 is a diagram illustrating generating object identification information by applying a weight to determination information according to one embodiment of the present disclosure.

Referring to FIG. 9, which illustrates generating object identification information by applying a weight to determination information according to one embodiment of the present disclosure, The object identification information may be generated by calculating and applying each weight to the face determination information, the noise print determination information, the voice determination information, and the motion determination information. The accuracy of the output value obtained by applying weights to the face determination information (0.90), noise print determination information (0.95), voice determination information (1.00), and motion determination information (0.98), respectively may be analyzed, and object identification information, and the weight value with the highest accuracy may be calculated and applied.

FIG. 10 is a diagram illustrating connection between a companion animal life management system implemented according to one embodiment of the present disclosure, and a user terminal and a provider server.

Referring to FIG. 10, a companion animal life management system according to one embodiment of the present disclosure may be connected to a user terminal to receive individual history information registered by a user using an application installed on the user terminal, and may receive face image data, motion video data, and voice data about the companion animal collected through a camera or CCTV.

The companion animal life management system may provide individual history information to a server of a service provider providing services to the companion animal, and may recommend services and products related to the history information and usage history of the companion animal based on the individual history information.

FIG. 11 is a diagram illustrating a location-based local community service implementable using a companion animal life management system implemented according to one embodiment of the present disclosure.

FIG. 11 shows a flowchart of providing location-based local community services to a user based on a companion animal life management system according to one embodiment of the present disclosure.

According to one embodiment of the present disclosure, by further collecting real-time location data using GPS based on individual life information generated through the companion animal life management system, the data may be grouped by local community according to real-time location to provide community services such as localized SNS, friend finder, club walking group, and local sharing market.

FIG. 12 is a diagram illustrating a companion animal IOT service implementable using a companion animal life management system implemented according to one embodiment of the present disclosure.

FIG. 12 shows a flowchart of providing a companion animal IOT service to a user based on a companion animal life management system according to one embodiment of the present disclosure.

According to one embodiment of the present disclosure, collected information about a companion animal may be transmitted to the companion animal life management system through a network method such as GPS, smart tag, beacon, Bluetooth, NFC, or Wi-fi. Individual life information may be updated based on the collected information, and services such as finding abandoned dogs, checking activity level, finding current location, and caring for companion animals using IOT devices may be provided based on the individual life information.

FIG. 13 is a flowchart illustrating a companion animal identification method according to one embodiment of the present disclosure.

Acquired individual data is generated by matching the face image data, motion video data, and voice data acquired for each individual from the companion animal to be registered with individual identification ID codes and individual history information for each individual (S10).

According to one embodiment of the present disclosure, the acquired individual data may be generated by matching face image data, motion video data, and voice data acquired per individual from a companion animal to be registered with an individual-specific individual identification ID code and individual history information for each individual According to one embodiment of the present disclosure, the face image data, motion video data, and voice data may be acquired for the companion animal to be registered using devices such as a camera, CCTV, and a microphone.

According to one embodiment of the present disclosure, the individual identification ID code may mean a code consisting of certain letters or numbers to identify the companion animal to be stored when registering the companion animal.

According to one embodiment of the present disclosure, the individual history information may include the breed, date of birth, age of the companion animal, residence information, health information, veterinary care information, product preference, product in use, or grocery information.

Identification feature data including at least one of face identification data, nose print identification data, voice identification data, and motion identification data generated by inputting the acquired individual data into an artificial intelligence-based recognition model is generated (S20).

According to one embodiment of the present disclosure, the acquired individual data may be input to the artificial neural network-based recognition model to generate identification feature data including at least one of the face identification data, nose print identification data, voice identification data, and motion identification data generated through at least one of the recognition techniques of face recognition, nose print recognition, voice recognition, and motion recognition.

According to one embodiment of the present disclosure, the artificial neural network-based recognition model may be a computational model based on an artificial neural network, and may be formed as a convolutional neural network (CNN), but is not limited to.

According to one embodiment of the present disclosure, the artificial neural network-based recognition model may be formed as a CNN, which performs convolutional operations using a plurality of convolutional computation layers. The plurality of convolutional computation layers may be divided into first, second, third, and fourth layer groups, each including a plurality of layers.

According to the above embodiment, the first, second, third, and fourth layer groups may implement functions of face recognition, nose print recognition, voice recognition, and motion recognition, respectively, as will be described in more detail with reference to FIG. 3.

According to one embodiment of the present disclosure, the identification feature data may mean data including information about features by which an individual can be recognized according to each recognition method. The identification feature data may be generated to include at least one of face identification data, nose print identification data, voice identification data, and motion identification data generated through an artificial neural network-based recognition model.

The artificial intelligence-based recognition model according to one embodiment of the present disclosure is formed as a convolutional neural network (CNN) and performs convolutional operations using a plurality of convolutional operation layers. The plurality of convolutional operation layers may be divided into first, second, third, and fourth layer groups, each including a plurality of layers. The first, second, third, and fourth layer groups may perform the functions of face recognition, nose print recognition, voice recognition, and motion recognition through respective convolutional operations.

According to one embodiment of the present disclosure, the first layer group of the artificial intelligence-based recognition model may extract a plurality of feature points from the acquired face image data, and input information about the extracted plurality of feature points to the artificial neural network-based face identification model to generate face identification data that enables face identification considering the breed or gender.

According to one embodiment of the present disclosure, as a preprocessing step for extracting feature points and performing feature point analysis using an artificial neural network-based face identification model, a face image may be generated by first searching for the face of a companion animal and capturing the found image identified as a face.

According to one embodiment of the present disclosure, multiple feature points may be extracted from the captured face image. In order to minimize the consumption of computing resources and reduce the extraction time in extracting the features, the number of features to be extracted may be limited to a small number.

According to one embodiment of the present disclosure, when the number of features to be extracted is limited to a small number, the recognition accuracy must be maintained at or above a certain level while extracting a small number of features. Therefore, it is necessary to select features at advantageous positions to identify the face shape of the animal. Depending on the positions of the features, the amount of computing resources required to recognize the face, the recognition speed, and the recognition accuracy may vary greatly.

According to one embodiment of the present disclosure, a multi-object recognition technique may be used to extract the feature points. Among such techniques, the Oriented FAST and Rotated BRIEF (ORB) algorithm may be employed.

According to the above embodiment, a window region may be taken and the brightness value of the center point may be compared with 16 brightness values. For example, the brightness values located at 1, 5, 9, and 13 may first be compared and assigned a value of 1 when dark or bright and 0 when similar, and points with a value greater than 3 may be selected as candidate feature points.

Then, the remaining brightness values are compared to determine a point as a feature point when the value is greater than or equal to 12, and a pixel with the greatest value among 8 neighbor pixels around each feature point is determined as the final feature point. To remove blob feature points from the feature points and extract corner feature points, Hans Corner Detection can be utilized.

In this case, since Hans Corner Detection can recognize the corner area, only the corner can be extracted, and furthermore, the direction can be determined using the Intensity Centroid to obtain the main direction.

According to the above embodiment, creating a partial image around each feature point, rotating all comparison points using the main direction, and constructing a bit string description is less informative and differentiating.

To address this issue, p(x) and p(y) are not arbitrarily determined, but two pixel selection patterns with good informativeness and discrimination may be determined and made into training data, and 256 binary tests may be obtained based on the training data to generate descriptors.

According to one embodiment of the present disclosure, the first layer group extracts eight feature points from the captured face image. The eight extracted points may include a center point of the left eyeball, a center point of the right eyeball, a nose, an end point of the left ear, an end point of the right ear, a right contact point of the left ear and the forehead, a left contact point of the right ear and the forehead, and a top center end point of the forehead.

According to the above embodiment, the identification accuracy may be increased by performing normalization based on multiple training data from which the eight feature points are extracted, and training a face identification model based on an artificial neural network to identify a breed and gender by inputting the feature point information based on a dataset generated by applying weights to the training data and the normalized training data, and to generate face identification data capable of identifying an object by inputting the identified breed and gender information and image data of a region of interest.

According to one embodiment of the present disclosure, as a result of identifying the breed and gender through the artificial neural network-based face identification model, the optimal weight for the training data and the normalized training data may be calculated based on the average accuracy and the corrected accuracy obtained based on the number of images determined as correct and the number of images determined as incorrect.

According to one embodiment of the present disclosure, in a simulation of face recognition by extracting a small number of feature points for both dogs and cats, at least eight feature points should be extracted in order to obtain a recognition rate of more than 75.32%. In particular, when the eight extracted feature points are the center point of the left eyeball, the center point of the right eyeball, the nose, the end point of the left ear, the end point of the right ear, the right contact point of the left ear and the forehead, the left contact point of the right ear and the forehead, and the top center end point of the forehead, as shown in FIG. 4, the simulation results show a face recognition rate of more than 93.21%.

According to one embodiment of the present disclosure, in order to secure a high identification accuracy in generating a dataset for training a face identification model based on an artificial neural network, normalization is performed on the training data as shown in Equation 1, and the identification accuracy is calculated when the training data and the normalized training data are used for training. Then, based on the identification accuracy, the optimal weight is calculated and applied to use a weighted average between the training data and the normalized training data by training through the dataset generated by the training data and the normalized training data.

In Equation 1, P(Decision) may denote the identification accuracy of the identification model trained based on the generated dataset, $P(D_{raw})$ may denote the identification accuracy of the training data, $P(D_{normalized})$ may denote the identification accuracy of the normalized training data, and a may denote the weight index.

Here, for all images included in the training data and the normalized training data, TP may denote the number of images determined as correct, FN may denote the number of images determined as incorrect, and FN+TP may denote the total number of images. For correction of accuracy, i may denote the selected class (breed or gender) and N may denote the total number of classes.

The variable average may denote average accuracy, which may mean an average accuracy obtained based on the number of correctly predicted breeds and genders, and balance may denote corrected accuracy, which may mean an average accuracy between breeds, regardless of the number of images within each breed and gender.

According to one embodiment of the present disclosure, when the number of images evaluated for each class is the same, the average accuracy and the corrected accuracy should be the same. However, there is a difference between these accuracies due to the unbalanced number of images among the classes. To resolve this issue, the average accuracy and the corrected accuracy may be obtained based on the number of images determined as correct and the number of images determined as incorrect as a result of identifying the breed and gender, and the optimal weight index may be calculated such that the two accuracies are equalized. The calculated weight index may be applied to the training data and the normalized training data.

According to the above embodiments, the simulation results show that the weight index a has a high identification accuracy in the range of $0.38<\alpha<0.73$, and that, on average, the weight index a tends to have a high identification accuracy as it approaches 0.5.

According to one embodiment of the present disclosure, a may be preset to 0.5, and may be updated by calculating an optimal weight index such that the average accuracy and corrected accuracy are uniform.

According to one embodiment of the present disclosure, the identified breed and gender information and the region of interest image data may be input to an artificial neural network-based face identification model to train the model to generate face identification data for identifying an individual, thereby increasing the identification accuracy.

According to one embodiment of the present disclosure, the artificial neural network-based face identification model may be formed as a convolutional neural network (CNN), which may perform convolutional operations with multiple convolutional operation layers, and may be structured as a first layer group and a second layer group by dividing some of the convolutional operation layers and the remaining part.

According to one embodiment of the present disclosure, information about the extracted feature points may be input to the first layer group of the artificial neural network-based face identification model to primarily derive breed identification information and gender identification information.

According to one embodiment of the present disclosure, information about eight feature points including the center point of the left eyeball, the center point of the right eyeball, the nose, the end point of the left ear, the end point of the right ear, the right contact point of the left ear and the forehead, the left contact point of the right ear and the forehead, and the top center end point of the forehead extracted from the image of the region of interest may be input to an input layer of the first layer group of the artificial neural network-based face identification model, and convolutional operations may be performed through multiple convolutional layers to derive breed identification information and gender identification information about the identified breed and gender.

According to one embodiment of the present disclosure, the output value of the first layer group of the artificial neural network-based face identification model and information about the extracted feature points are input to the input layer of the second layer group of the artificial neural network-based face identification model to generate object identification information, and a confidence score for the object identification information may be calculated based on the object identification information. The predictability of the face identification data may be calculated based on the confidence score of the object identification information, breed identification information, and gender identification information.

According to one embodiment of the present disclosure, the predictability of the face identification data may be calculated based on the confidence score of the object identification information, the breed identification information, and the gender identification information, as shown in Equation 2.

Here, P(id|g, b; s) may denote the predictability of the face identification data, Score(id) may denote the confidence score of the object identification information, $Ind_G(id;g)$ may denote the gender identification information, $Ind_B(id;b)$ may denote the breed identification information, and Z(g, b; s) may denote the normalization factor of each information.

According to one embodiment of the present disclosure, the second layer group of the artificial intelligence-based recognition model may extract a rectangle-shaped region of interest included in a circle having a diameter of 10 to 15 cm that includes the boundaries of two nostrils of a companion animal from the face image data, and perform contrast-limited adaptive histogram equalization and scale-invariant feature transform on the region of interest to extract feature points according to the inner Gaussian difference to generate the noise print identification data.

According to one embodiment of the present disclosure, a region of interest in the shape of a rectangle included in a circle with a diameter of 10 to 15 cm that includes the boundaries of two nostrils of a companion animal may be extracted from a face image, and contrast-limited adaptive histogram equalization and scale-invariant feature transform may be performed on the region of interest to extract the noise print according to the inner Gaussian difference to generate the noise print identification data.

According to one embodiment of the present disclosure, based on the noise print identification data, face determination information about whether a noise print data with a predetermined similarity or higher is present among the stored noise print data may be generated.

According to one embodiment of the present disclosure, in extracting a noise print from a region-of-interest image extracted from the face image, information loss may occur when the size of the region-of-interest image is excessively large or excessively small. Accordingly, resizing may be performed using Equation 3 to perform image resizing while maintaining the width and height ratio of the original image.

Here, S may denote a scale factor, w may denote a width, and h may denote a height, where w' may be a resized width and h' may be a resized height, r may be a reference value for resizing. According to one embodiment of the present disclosure, the reference value for resizing may be a size of 300×300 pixels or 300×400 pixels.

According to one embodiment of the present disclosure, contrast-limited adaptive histogram equalization may be performed on the resized region-of-interest image.

As used herein, histogram equalization refers to a representative image enhancement method that uses a cumulative distribution function of pixel values in an image. Conventional equalization increases the contrast of the entire image, resulting in many cases where the effect is not satisfactory.

According to one embodiment of the present disclosure, in order to overcome the limitations of the conventional equalization technique, equalization may be performed by applying the contrast-limited adaptive histogram equalization, which is a more advanced equalization technique.

Here, the contrast-limited adaptive histogram equalization refers to a technique that equalizes the histogram within each region by dividing the image into small regions and removing extreme noise using contrast limit. The contrast limit refers to a method of enhancing contrast more in darker areas and less in lighter areas.

In another embodiment of the present disclosure, the nose of a dog or cat, which makes up the majority of companion animals, is typically dark compared to the rest of the face, the image of the nose of a dog or cat, including the nose print, is often relatively low in contrast compared to the other images, and the same dog or cat may appear different in different images due to differences in lighting or illumination. Therefore, the contrast value can be adjusted by performing the contrast-limited adaptive histogram equalization to have a constant contrast level.

According to one embodiment of the present disclosure, the contrast-limited adaptive histogram equalization may be performed iteratively until the histogram is sufficiently stretched to reduce contrast differences between images and improve contrast. More specifically, it may be performed iteratively until more than 1000 pixels can be identified for a region-of-interest image.

According to one embodiment of the present disclosure, a feature extraction algorithm such as SIFT, SURF, BRISK, or ORB may be used to extract the feature points, and a keypoint detector and a descriptor may be used to find keypoints in the image, and a scriptor may generate information describing the keypoints.

According to one embodiment of the present disclosure, the noise print identification data may be generated by performing scale-invariant feature transform (SIFT) and extracting feature points based on the inner Gaussian difference.

According to the above embodiment, multiple image scale spaces may be generated by performing the SIFT, and feature points may be extracted by searching for a maximum edge as a keypoint in the space through a difference of Gaussian (DoG) detector as shown in Equation 4. Thereby, noise print identification data may be generated.

According to one embodiment of the present disclosure, the third layer group of the artificial intelligence-based recognition model may segment the voice data into multiple frames according to a preset reference value, extract a feature vector for the segmented frames to perform histogram modeling to acquire a code according to the histogram modeling, and generate voice identification data including the code according to the histogram modeling.

The acquired voice data of the companion animal may be segmented into multiple frames according to a preset reference value, and feature vectors may be extracted from the segmented frames to perform histogram modelling. A code may be acquired according to the histogram modeling to generate voice identification data.

According to one embodiment of the present disclosure, multiple frames may be generated by segmenting the acquired voice data of a companion animal by a certain length according to a preset reference value, and histogram modeling may be performed to extract a feature vector from each of the frames to create a histogram model, and a code may be generated according to the shape of the histogram model formed through histogram modeling.

Here, the histogram modeling means that the envelope constituted by the histogram of the defect signal information by normalizing the sound emission signal to 256 steps is modeled as a feature, and the features of the modeled envelope are extracted from the modeled defect signal using partial autocorrelation coefficients (PARCOR), and the features representing the unique characteristics of the defect signal are selected by the distance evaluation technique (DET) to generate an identifiable code.

According to one embodiment of the present disclosure, voice identification data may be generated to include the generated code, and voice determination information may be generated by determining whether a code of voice data having a predetermined similarity or higher is present among the codes of voice data stored in the database.

According to one embodiment of the present disclosure, the fourth layer group may segment the video data into multiple consecutive frames based on a preset reference, and analyze the multiple frames to generate motion identification data for a structured pattern present in the motion of the companion animal.

According to one embodiment of the present disclosure, in generating motion identification data, the multiple frames may be analyzed to identify a motion of a companion animal, and the motion dynamics of the motion over a period of time may be analyzed and the repeated motion dynamics of the motion may be stored as a structured pattern, and motion identification data including information about the stored structured pattern may be generated.

Individual registration data including identification feature data and individual identification ID code and individual history information for each individual matched with the identification feature data is generated, and is registered in the database (S30).

The individual registration data including the identification feature data and an individual identification ID code and individual history information for each individual matched with the identification feature data may be generated and registered data in the database.

According to one embodiment of the present disclosure, the individual registration data including the identification feature data and the individual identification ID code and individual history information for each individual matched with the identification feature data may be generated.

According to one embodiment of the present disclosure, the individual registration data may be registered by storing the individual registration data in the database. The database may be implemented in the form of a repository or server located within or outside the companion animal life management system 10.

Identification request data including identification feature data, acquisition location information, and acquisition time information generated by inputting face image data, motion video data, and voice data for a companion animal whose identification is requested into an artificial intelligence-based recognition model is generated (S40).

According to one embodiment of the present disclosure, face image data, motion video data, and voice data for a companion animal whose identification is requested may be input into the artificial neural network-based recognition model to generate identification request data including identification feature data of at least one of face identification data, nose print identification data, voice identification data, and motion identification data generated through at least one of the recognition techniques of face recognition, nose print recognition, voice recognition, and motion recognition, as well as acquisition location information and acquisition time information.

According to one embodiment of the present disclosure, the face image data, motion video data, and voice data acquired through a camera, CCTV, a microphone, or the like may be analyzed through at least one of the recognition techniques of face recognition, nose print recognition, voice recognition, and motion recognition using an artificial neural network-based recognition model, thereby generating identification feature data of at least one of the face identification data, nose print identification data, voice identification data, and motion identification data.

According to one embodiment of the present disclosure, identification feature data may be generated by inputting face determination information, nose print determination information, and voice determination information into an artificial neural network-based individual identification model. In generating the identification feature data based on the face determination information, nose print determination information, and voice determination information, the identification feature data may be generated by calculating and applying a weight to each of the face determination information and nose print determination information, thereby improving identification accuracy.

By comparing the identification request data with the identification feature data included in the individual registration data stored in the database, it is determined whether individual registration data having a predetermined similarity or higher is present, and identification individual information is generated based on the determination result (S50).

According to one embodiment of the present disclosure, it may be determined whether individual registration data having a predetermined similarity or higher is present by comparing the identification request data with the identification feature data included in the individual registration data stored in the database, and identification individual information may be generated based on the determination result.

According to one embodiment of the present disclosure, the identification feature data including at least one of face identification data, nose print identification data, voice identification data, and motion identification data for an individual whose identification is requested, and the individual registration data including at least one of face identification data, nose print identification data, voice identification data, and motion identification data stored in the database may be used to determine whether individual registration data having a predetermined similarity or higher is present for each of the face identification data, nose print identification data, voice identification data, and motion identification data to generate the identification individual information.

Acquisition location information, acquisition time information, and individual identification ID code and individual history information for each individual in the individual registration data matched with the identification individual information are added or updated to the individual life information (S60).

According to one embodiment of the present disclosure, the acquisition location information, the acquisition time information, and the individual identification ID code and individual history information for each individual included in the individual registration data matched with the identification individual information may be added or updated to the individual life information.

According to one embodiment of the present disclosure, individual life information may be generated based on individual identification ID code and individual history information for each individual in the individual registration data that has similarity to the identification feature data of the companion animal whose identification is requested. If there is existing individual life information, addition or updating may be performed.

The embodiments of the present disclosure are not only implemented through the apparatus and/or methods described above. Although the embodiments of the present disclosure have been described in detail above, the scope of the present disclosure is not limited thereto. Various modifications and variations by those skilled in the art using the basic concepts of this disclosure, as defined in the appended claims, are also within the scope of the present disclosure.

The invention claimed is:

1. A companion animal life management system comprising:
   an acquired individual data generation unit configured to generate acquired individual data by matching face image data, motion video data, and voice data acquired for each individual from a companion animal to be registered with an individual identification ID code and individual history information for each individual;
   an identification feature data generation unit configured to input the acquired individual data into an artificial neural network-based recognition model to generate identification feature data including at least one of face identification data, nose print identification data, voice identification data, or motion identification data generated through at least one recognition technique among face recognition, nose print recognition, voice recognition, or motion recognition;
   an individual registration unit configured to generate individual registration data including the identification feature data and an individual identification ID code and individual history information for each individual matched with the identification feature data and to register the individual registration data in a database;
   an identification request data generation unit configured to input the face image data, motion video data, and voice data for a companion animal whose identification is requested into the artificial neural network-based recognition model to generate identification request data including identification feature data of at least one of the face identification data, nose print identification data, voice identification data, or motion identification data generated through the at least one recognition technique among the face recognition, nose print recognition, voice recognition, or motion recognition, as well as the acquisition location information and acquisition time information;
   an identification individual information generation unit configured to determine whether individual registration data having a predetermined similarity or higher is present by comparing the identification request data with the identification feature data included in the individual registration data stored in the database and to generate identification individual information based on a result of the determination;
   an individual life information management unit configured to manage the acquisition location information, the acquisition time information, and the individual identification ID code and individual history information for each individual included in the individual registration data matched with the identification individual information by adding or updating the same to individual life information;
   wherein the artificial neural network-based recognition model is formed as a convolutional neural network (CNN) and performs convolutional operations using a plurality of convolutional operation layers, wherein the plurality of convolutional operation layers is divided into first, second, third, and fourth layer groups, each including a plurality of layers,
   wherein the first layer group extracts a plurality of feature points from the acquired face image data, and inputs the extracted plurality of feature points into an artificial neural network-based face identification model to generate face identification data for identifying a face considering a breed or gender,
   wherein the second layer group extracts, from the face image data, a rectangle-shaped region of interest included in a circle having a diameter of 10 to 15 cm that includes boundaries of two nostrils of the companion animal, and performs contrast-limited adaptive histogram equalization and scale-invariant feature transform on the region of interest to extract feature points according to an inner Gaussian difference to generate the nose print identification data,
   wherein the third layer group segments the voice data into a plurality of frames according to a preset reference value, extracts a feature vector for the segmented frames, performs histogram modeling to acquire a code according to the histogram modeling, and generates the voice identification data including the code according to the histogram modeling, and wherein the fourth layer group segments video data into a plurality of consecutive frames according to a preset reference, and analyzes the plurality of frames to generate the motion identification data for a structured pattern present in a motion of the companion animal.

2. The system of claim 1, wherein the first layer group is configured to:
  extract eight feature points from a captured face image, the eight feature points comprising a center point of a left eyeball, a center point of a right eyeball, a nose, an end point of a left ear, an end point of a right ear, a right contact point of the left ear and a forehead, a left contact point of the right ear and the forehead, and a top center end point of the forehead;
  perform normalization based on a plurality of training data from which the eight feature points are extracted, and an artificial neural network-based face identification model to identify a breed and gender upon inputting of feature point information based on a dataset generated by applying weights to the training data and the normalized training data, and to generate face identification data for identifying an object by inputting the identified breed and gender and image data of the region of interest to increase identification accuracy; and
  calculate an optimal weight for the training data and the normalized training data based on an average accuracy and a corrected accuracy obtained based on the number of images determined as correct and the number of images determined as incorrect as a result of identifying the breed and gender through the artificial neural network-based face identification model.

3. The system of claim 2, wherein the system is configured to:
  perform a convolutional operation through a plurality of convolutional layers based on information about the eight feature points extracted from an image of the region of interest to derive breed identification information and gender identification information about the identified breed and gender; and
  generate individual identification information by performing a convolutional operation through a plurality of convolutional layers based on the breed identification information, gender identification information, and information about the extracted feature points, and calculate a confidence score for the individual identification information based on the individual identification information, and calculate a predictability of the face identification data based on the confidence score for the individual identification information, the breed identification information, and the gender identification information.

4. The system of claim 3, further comprising:
an insurance status determination unit configured to provide individual life information matching the companion animal requested to be identified, and to determine whether the companion animal is insured based on the individual history information included in the individual life information;
an insurance premium information generation unit configured to calculate, when it is determined that the companion animal is not insured, an insurance premium to be incurred based on the individual history information included in the individual life information, and to provide insurance premium information generated based on the calculated insurance premium; and
a premium billing unit configured to receive, when it is determined that the companion animal is insured, an input of a disease code and medical billing information, and automatically bill an insurance company for the insurance premium according to the disease code.

* * * * *